United States Patent [19]  
Coate et al.

[11] Patent Number: 4,678,334  
[45] Date of Patent: * Jul. 7, 1987

[54] SPLICELESS OPTICAL FIBER RESONANT RING LASER GYROSCOPIC SYSTEM

[75] Inventors: Godfrey T. Coate, Belmont; Joseph D. Coccoli, Sudbury, both of Mass.

[73] Assignee: The Charles Stark Draper Laboratory, Inc., Cambridge, Mass.

[*] Notice: The portion of the term of this patent subsequent to Apr. 30, 2002 has been disclaimed.

[21] Appl. No.: 496,579

[22] Filed: May 20, 1983

[51] Int. Cl.[4] .......................... G01C 19/64; G01B 9/02
[52] U.S. Cl. ..................................................... 356/350
[58] Field of Search ........................................ 356/350

[56] References Cited

U.S. PATENT DOCUMENTS 3,354,405 11/1967 Bebb et al. .  
3,958,188 5/1976 Fletcher et al. .  
4,013,365 3/1977 Vali et al. .............................. 356/350  
4,120,587 10/1978 Vali et al. .............................. 356/350  
4,136,929 1/1979 Suzaki .............................. 350/96.15

OTHER PUBLICATIONS

Stokes et al, "All-Single-Mode Fiber Resonator", Optics Letters, vol. 7, #6, Jun. 1982, pp. 288-290.  
Cahill et al, "Phase Nulling Optical Gyro", Proceedings of the IEEE 1979 National Aerospace & Electronics Conference, NAECON 1979, Dayton, Ohio, USA, (15-17 May 1979, pp. 8-13).

Primary Examiner—Vincent P. McGraw  
Attorney, Agent, or Firm—Weingarten, Schurgin, Gagnebin & Hayes

[57] ABSTRACT

A spliceless optical-fiber resonant-ring laser gyroscopic system is disclosed. The spliceless optical-fiber resonant-ring gyroscopic system includes a cylindrically-shaped monolithic housing fashioned from a material having an ultra-low coefficient of thermal expansion. A selected length of optical-fiber is mounted about the perimeter of the cylindrically-shaped housing and closed on itself to form an optical-fiber ring having at least one turn. The spliceless optical-fiber ring and an evanescant-wave directional coupler are provided by bringing the fiber proximate to the ends of the optical-fiber ring in parallel contiguity. A narrow-band gas-discharge helium-neon optical-frequency tunable laser is formed within the monolithic housing and operatively connected to the ends of the spliceless optical-fiber ring via an integrated-optics chip. The integrated-optics chip is operative to excite the spliceless optical-fiber ring in a clockwise and a counterclockwise direction sequentially and alternately at first and second pairs of frequencies in which the frequency separation in each pair is set at approximately the linewidth of the clockwise and the counterclockwise ring resonances, respectively. The mean frequencies of the first pair and the second pair of frequencies are controllably varied until the response of the ring at corresponding clockwise and counterclockwise excitations are each individually balanced. Signal processing means are responsive to the balanced ring responses and operative to compute the rate of angular rotation of the gyroscopic platform from the difference in mean frequencies at which the clockwise and counterclockwise balances occur.

8 Claims, 8 Drawing Figures

SPLICELESS OPTICAL FIBER RESONANT RING LASER GYROSCOPIC SYSTEM

FIELD OF THE INVENTION

This invention is drawn to the field of laser gyroscopes, more particularly to the field of passive optical gyroscopes, and still more particularly, to a spliceless optical-fiber resonant-ring gyroscopic system.

BACKGROUND OF THE INVENTION

Laser gyroscopic systems are known which employ spliced optical-fiber rings selectively excitable in the clockwise and the counterclockwise resonant modes and operative to provide a signal indication of the rate of angular rotation of a gyro platform. In many applications, such laser gyroscopes are called upon to provide an extremely sensitive signal indication of the angular-rotation rate. In these instances, the spliced optical-fiber resonant-rings provide clockwise and counterclockwise resonant modes having wider than desirable linewidths which limits the angular-rotation rate resolution capability and thereby their utility.

SUMMARY OF THE INVENTION

The novel laser gyroscopic system of the present invention includes a spliceless optical-fiber ring resonant in a clockwise and a counterclockwise mode providing comparatively narrow linewidths and a corresponding improvement in the rate of angular-rotation resolution capability and instrument sensitivity. A selected length of optical-fiber is formed into a coil having a number of turns. An evanescent-field directional coupler is provided along a common region proximate to the coil's ends by placing suitably prepared end leads of the fiber past each other in parallel continuity. The spliceless optical-fiber resonant-ring is coiled around a monolithic low-thermal-expansion cylindrically-shaped housing. The evanescent-field directional coupler is optically connected to a tunable narrowband gas-discharge laser via an integrated-optics chip. The integrated-optics chip is operative to sequentially and alternately induce a clockwise and a counterclockwise resonance in the spliceless optical-fiber ring. A signal processor is electronically connected to the integrated-optics chip and is responsive to signals representative of the match between the mean frequencies of predetermined frequency pairs and the resonant frequencies (i.e., line centers) of the clockwise and the counterclockwise resonant modes and operative to provide a signal indication of the rate of angular rotation of the gyro platform. The laser is preferably mounted within, and the integrated-optics chip is preferably mounted to a surface of, the monolithic cylindrically-shaped housing.

BRIEF DESCRIPTION OF THE DRAWINGS

The invention will become better understood by referring to the following exemplary and nonlimiting detailed description of the preferred embodiment, and to the drawings, wherein.

DETAILED DESCRIPTION OF THE PREFERRED EMBODIMENT

Figure 1:
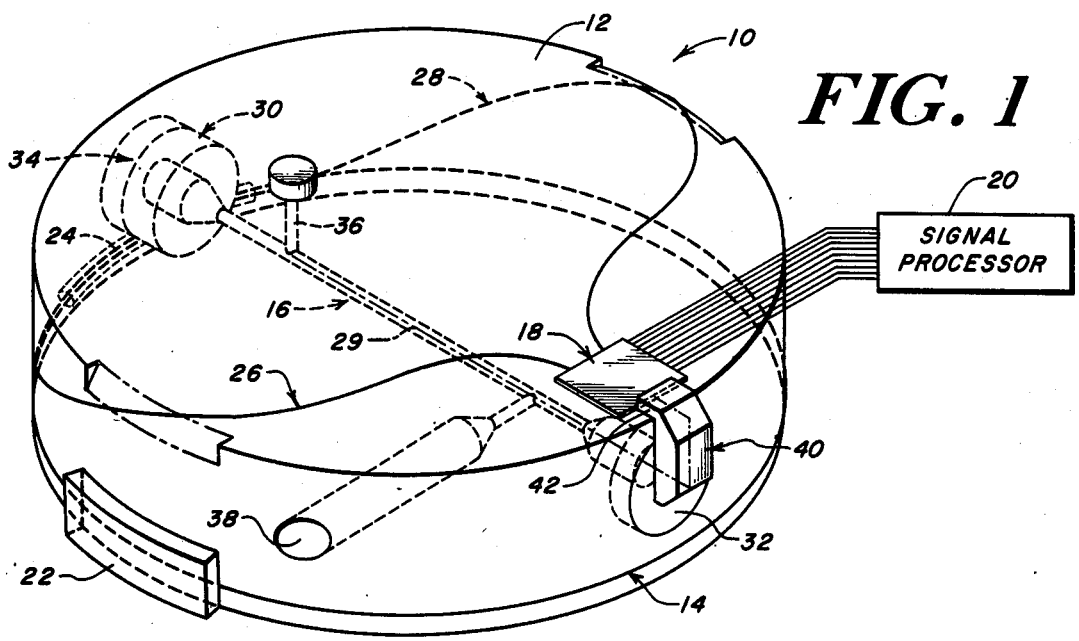
FIG. 1 shows a simplified pictorial view illustrating the novel, spliceless, optical-fiber resonant-ring gyroscopic system of the present invention.

Referring now to FIG. 1, generally shown at 10 is a novel spliceless optical-fiber resonant-ring gyroscopic system according to the present invention. The system 10 includes a cylindrically-shaped monolithic housing 12, a spliceless optical-fiber ring generally designated 14, to be described, coiled around the perimeter of the housing 12, and a tunable source of narrowband coherent light generally designated 16. An integrated-optics chip generally designated 18, to be described, is optically connected between the coherent light source 16 and the spliceless optical-fiber resonant-ring 14 for providing selective excitation of the clockwise and the counterclockwise resonances thereof, for controllably varying the frequency of the light excitation, and for providing a signal representative of the intensity of the light circulating with the resonant-ring. A signal processer 20, to be described, is connected to the integrated-optics chip 18 for controlling the integrated-optics chip, and for providing an extremely sensitive signal indication of the rate of angular rotation of a platform, not shown, to which the gyroscopic system of the invention is mounted.

The housing 12 provides a rigid mounting structure for the spliceless optical-fiber ring. Any suitable machineable material having an ultra-low coefficient of thermal expansion such as Cer-Vit or Zerodur can be employed. A piezoelectric (PZT) element 22 is mounted to the perimeter of the housing 12 by any suitable means such as threaded fasteners or In solder and firmly contacts segments of one or more of the coils of optical-fiber of the spliceless optical-fiber ring. The PZT element 22 is operative in known manner to selectively apply a lateral compressive stress to the enclosed fiber of the spliceless optical-fiber ring for controlling the optical characteristics thereof.

An evanescent-field directional coupler generally designated 24, to be described, is provided along a common region of the length of the optical-fiber proximate to the end segments 26 and 28 thereof. The evanescent-field directional coupler 24 preferably is mounted in a channel formed in the housing 12 dimensioned to receive a pair of parallel, contiguous, optical-fibers, to be described, which comprise the coupler.

The tunable source of narrowband coherent light 16 includes a longitudinally extending optical channel 29 terminated by a first transversely extending etalon 32 and a second transversely extending etalon 34 for defining an optically resonant cavity. The etalon 34 preferably is a fully reflecting mirror mounted to an extremely flat and selectively oriented surface provided therefor in the monolithic housing 12 over a 4-quadrant PZT element 30 operative to controllably displace and/or incline the etalon 34 and to provide optical-frequency bias control. The etalon 32 preferably is a partially reflecting mirror mounted to an extremely flat and selectively oriented surface provided therefor in the housing 12. The mirrors 32 and 34, and the PZT element 30, may be mounted by any suitable means such as optical contacting or In soldering.

The optical channel 29 is in communication with a transversely extending anode electrode channel 36 and a transversely extending cathode electrode channel 38. The channels 29, 34, and 36 preferably are formed within the monolithic housing 12 to provide a rugged and thermally stable laser cavity that is hermetically sealed for vacuum-tight integrity. A He-Ne laser is provided within the laser cavity at a preselected pressure and isotope ratios. It will be appreciated that although a He-Ne gas discharge laser system is illustrated, any other suitable coherent-light system that provides short-term frequency stability, frequency and mode control, narrow linewidth, and comparatively small size may be employed without departing from the inventive concept.

The integrated-optics chip 18 is preferably mounted on an extremely flat and polished surface provided therefor on the top of the housing 12. A Dove or other suitable prism 40 is mounted to the housing 12 in position to deviate the coherent light transmitted through the partially reflecting etalon 32 into a light input port provided on the integrated-optics chip. The displacement control provided by the four-quadrant PZT element 30, with the four-quadrants acting in unison, helps maintain the laser light power at a maximum by controlling the channel length 29 between etalons 32 and 34 to a small fraction of a wavelength. The tilt control provided by the four-quadrant PZT element 30, acting differentially, helps maintain an accurate alignment of the axis of the laser light beam with the axis of the integrated-optics chip at the input port. A singlet-type microlens 42 is positioned between and abutting the input port and the Dove prism to shape the laser-light into a field distribution that closely matches the mode distribution of the input port to minimize light losses. The output light ports of the integrated-optics chip are optically connected to the ends 26 and 28 of the spliceless optical-fiber resonant-ring 14. Provided the housing is fashioned from a suitable substrate, the integrated-optics chip 18 may also be directly deposited thereon.

Figure 2A:
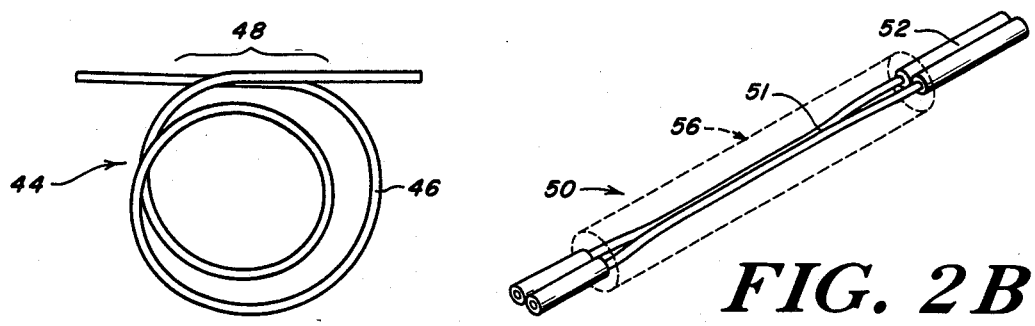
FIG. 2 shows in FIG. 2A a schematic diagram illustrating the spliceless optical-fiber ring, shows in FIG. 2B a detailed schematic diagram illustrating a step in the fabrication of an evanescent-field directional coupler, shows in FIG. 2C a detailed schematic diagram illustrating a further step in the fabrication of the evanescent-field directional coupler, and shows in FIG. 2D a cross-section of an optical-fiber, of the spliceless optical-fiber resonant-ring gyroscopic system of the present invention.

Referring now to FIG. 2A, generally designated at 44 is a spliceless optical-fiber resonant-ring of the spliceless optical-fiber resonant-ring gyroscopic system of the present invention. The ring 44 is a single length of cladded optical-fiber 46 closed on itself a preselected number of turns. Any suitable single-mode, low-loss optical-fiber can be employed. The total length of the optical-fiber, and correspondingly the number of turns, is selected as a function of such factors as the fiber attenuation coefficient, the performance specifications of the particular applications environment, the wavelength of the coherent-light source, and the optical-fiber cost, among others. The axis of the ring defines the rotation sensing direction.

An evanescent-wave directional coupler designated by a bracket 48 is provided along a common, parallel, contiguous region of the lengths of the fiber thereof proximate the two ends of the fiber. The couping coefficient of the evanescent-field directional coupler is selected to be close to unity, with the difference from unity equal to the total fractional loss of the fiber. For example, if the fiber losses due to both the attenuation and radiation induced by the bending is 0.5%, the coupling coefficient is selected to be 99.5%.

Figure 2B:
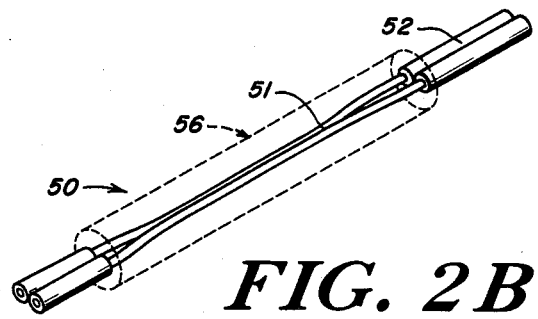
Figure 2C:
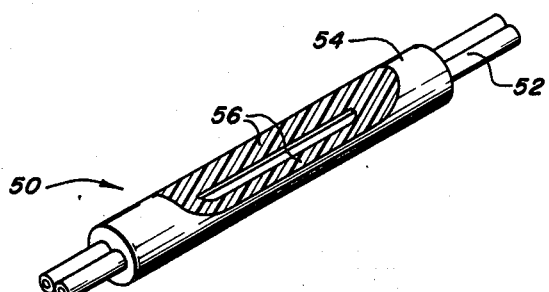
Figure 2D:
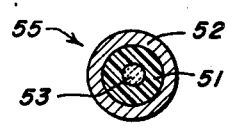

Referring now to FIGS. 2B and 2C, generally shown as 50 is a schematic diagram showing a preferred construction of the evanescent-field directional coupler of the spliceless optical-fiber resonant-ring gyroscopic system of the present invention. The protective jacket 52 of the optical fiber, whose cross-section 55 is shown in FIG. 2D, proximate to the two ends is removed by any suitable means and then the diameter of the cladding 51 in the common region of the optical-fiber proximate the two ends is reduced by any suitable technique, such as etching or mechanical lapping and polishing, until the cores 52 of the optical-fibers can be brought into selected close proximity as shown in FIG. 2B. A stress-relief slotted-jacket 54 (shown in FIG. 2C) is positioned around the optical-fibers in the region where the cladding is removed. An optical-index matched potting material 56 is provided in the slot and allowed to set. The material 56 maintains the fibers in a preselected spaced-apart relation to provide an intended coupling coefficient therebetween whose difference from unity is selected to match the total fractional loss of circulating light power due to attenuation and bending-induced radiation losses. Reference may be had to an article entitled "All Single Mode Fiber Resonator" by Stokes et al, appearing at volume 7, number 6, Optics Ltrs. 88 (June, 1982), incorporated herein by reference, for the equations governing resonance and relating circulating to output light intensities in a spectroscopy system.

Figure 3:
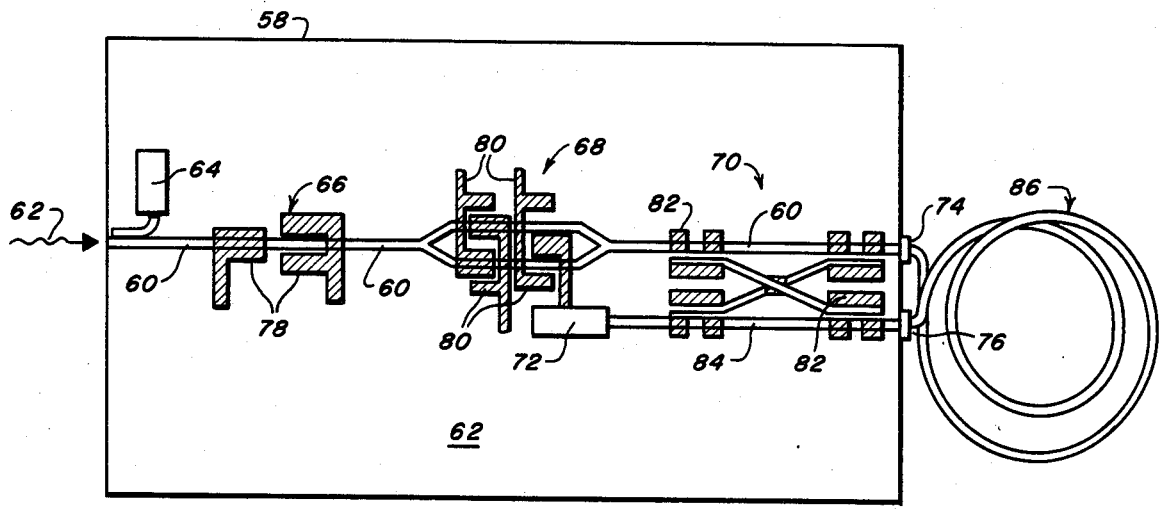
FIG. 3 shows a schematic diagram illustrating an integrated-optics chip of the spliceless optical-fiber resonant-ring gyroscopic system of the present invention.

Referring now to FIG. 3, shown by a box designated 58 is a diagrametic view of an integrated-optics chip of the spliceless optical-fiber resonant-ring gyroscopic system of the present invention. The integrated-optics chip 58 includes a waveguide 60 adapted to receive laser-light 62 and to guide the received light along the integrated-optics chip for optical processing. An AGC photodetector 64 is optically connected via a weak coupler to the waveguide 60 which deviates a selected small fraction of the laserlight thereto. A polarization controller generally designated 66 is connected to the waveguide 60 and operative to match the state of the polarization of the laserlight with a principal state of polarization of one of the modes of the travelling-wave resonances in the spliceless optical-fiber resonant-ring. Normally, the states of the modes are elliptically polarized. An optical-frequency controller 68 is connected to the waveguide 60 and operative to controllably vary the frequency of the selectively polarized laserlight. A 2×2 crossbar switch generally designated 70 is connected between the optical-frequency controller 68 and a photodetector 72, and to first and second light ports 74 and 76 via linear waveguide to optical-fiber coupler interfaces, not shown. The ends of a spliceless optical-fiber ring generally designated 86 are connected to the ports 74, 76. Additional polarizers, not shown, may be fabricated on the chip to achieve additional isolation of the selected state of polarization.

The AGC photodetector 64 is preferably deposited on the substrate 62 and operative in response to the small fraction of light incident thereon via the weak coupler to provide a signal representative of the intensity of the laserlight. Any fluctuation in the intensity of the laserlight occassioned by such factors as thermal aging is automatically compensated in the usual manner.

The polarization controller 66 preferably includes a photolithographically deposited array of metal electrodes 78 bracketing the waveguide 60 and configured in a well known manner to provide polarization control of the coherent light. Electrical signals applied to the electrodes 78 are operative to controllably rotate the orthogonal states of elliptical polarization of the coherent light in proportion to the magnitude of the applied voltage. The states of polarization of the coherent light are controllably rotated to match the selected states of polarization of the spliceless optical-fiber resonant-ring to prevent interference from the unwanted states, and also to more efficiently utilize the available power.

The optical-frequency controller 68 preferably includes a photolithographically deposited array of metal electrodes 80 bracketing a region of the waveguide 60 having a "Y" and an inverse "Y" junction. The electrodes 80 are arranged in a well known manner to provide a type of Mach-Zender interferometer. Radio frequency (RF) signals with opposite phase are applied to the electrodes 80 which electrostrictively stress the waveguide branches between the "Y" and the inverse "Y" junctions and controllably alter therein the phase velocity of the laserlight. At the inverse "Y" junction, the laserlight recombines and has one sideband frequency which is the sum of the optical-frequency of the laserlight and the frequency of the impressed RF electrical signals. Means not shown must be provided on the integrated-optics chip for rejecting the difference sideband.

The 2×2 crossbar switch 70 preferably includes a photolithographically deposited array of metal electodes 82 bracketing the waveguide 60, and bracketing a parallel waveguide branch 84 arranged in a well known manner to provide a cross-switching function. The waveguide 60 is connected between the optical-frequency controller 68 and the light port 74. The waveguide 84 is connected between the photodetector 72 and the light port 76. In the absence of a voltage on the electrodes 82, the laserlight present in the waveguide 60 crosses over and exits at the port 76 into the spliceless optical-fiber resonant-ring 86, and excites a resonance in the clockwise direction therein. The light returns from the ring 86, enters the light port 74, and traverses the switch 70 where it crosses over and is directed to the photodetector 72. An appropriate voltage applied to the electrodes 82 destroys the cross-coupling so that the laser light present in the waveguide 60 from the optical-frequency controller 68 passes to the light port 74 into the ring 86, and excites a resonance in a counterclockwise direction therein. Light returning from the ring 86 is incident on the light port 76 and is guided over the waveguide 84, again without cross-coupling, to the photodetector 72. The polarization controller 66, the optical-frequency controller 68, and the 2×2 crossbar switch 70 are controlled and synchronized by the electronic processor of the present invention in a manner to be described.

A travelling coherent electromagnetic wave at light frequencies circulating in the spliceless optical-fiber ring 86 destructively interferes with itself unless its wavelength, $\lambda$, satisfies the condition $\lambda = L/N$, where N is a large integer and L is the total length of the optical-fiber in the coiled ring. If the ring is not at resonance, the magnitude of the circulating light is negligible, and the magnitude of the input light intensity is substantially equal to the magnitude of the output light intensity. When $\lambda = L/N$, however, the ring is said to be operating at a resonant frequency of the $N^{th}$ mode $f_N = (c/n)(N/L)$, where c is the speed of light in vacuum and n is the effective index of refraction of the optical-fiber. In this case, the light circulating in the spliceless optical-fiber resonant-ring is in phase with additional light entering the ring from the evanescent-wave directional coupler, and the intensity of the circulating light increases until it has a magnitude such that the rate at which light energy is lost in the ring due to attenuation and radiation induced by the bending is equal to the rate at which energy is supplied by the input wave. The circulating light coupled out of the ring destructively interferes with the input light that passes directly through the evanescent-wave directional coupler without coupling and results, at resonance, in a deep dip in the intensity of the light leaving the output port of the ring.

In a ring that is not rotating about its axis in inertial space, the path length in the clockwise direction appears to an observer on the ring to be the same as the path length in the counterclockwise direction, and the frequency of the clockwise resonant mode $f_{N,cw}$, and the frequency of the counterclockwise resonance $f_{N,ccw}$, have the same value. However, if the ring is rotating at a rate $\omega$ radians per second, for example in the clockwise direction, an observer on the ring observes that the path length in the clockwise direction appears longer than in the counterclockwise direction which results in a frequency difference $\Delta f$ between the clockwise and the counterclockwise ring resonances. It can be shown that $\Delta f = 4A\,\omega/n\lambda_0 l$, where A is the area enclosed by the ring, $\lambda_o = c/f_N$ is the vacuum wavelength, and l is the length of a single coil. By detecting the frequency difference between the clockwise and the counterclockwise ring resonances, the rate of angular rotation of the gyro platform is determined.

Figure 4:
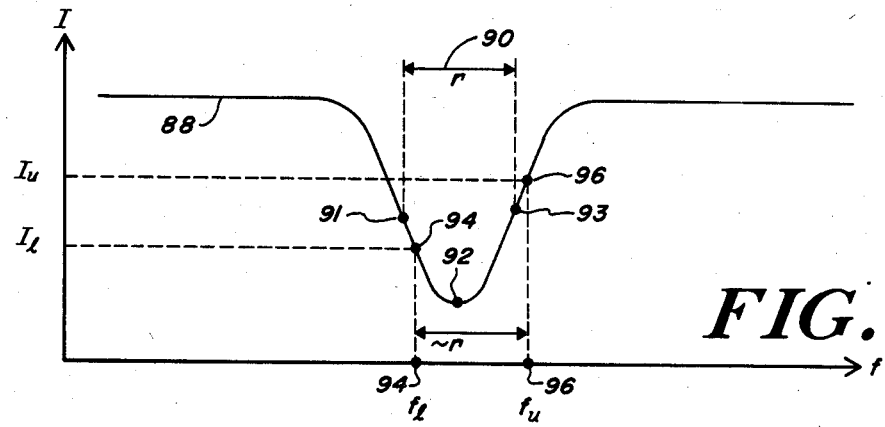
FIG. 4 shows a graph illustrating the resonant-mode operation of the spliceless optical-fiber resonant-ring gyroscopic system of the present invention.

Referring now to FIG. 4, a spectral response curve for a ring resonance designated 88 is plotted in a Cartesian coordinate system having as the ordinate the intensity, I, of the output light from the coupler and as the abscissa the frequency of the applied excitation. At resonance in either the clockwise or the counterclockwise direction, the light intensity output from the ring experiences a minimum as shown. The frequency separation between the half-power points of the spectral response curve 88 is designated 90 and labelled $\Gamma$.

To determine the line center of the resonance designated 92 for the $N^{th}$ resonant mode $f_N$, the ring is excited at a first frequency $f_l$ designated 94 and then at a second frequency $f_u$ designated 96. The frequencies $f_u$ and $f_l$ have therebetween a constant frequency separation selected to optimize performance and determined by noise characteristics of the photodetector and shape of the spectral curve; generally the separation is approximately equal to $\Gamma$. The output intensities respectively designated $I_l$ and $I_u$ corresponding to the excitation at the frequencies $f_l$ and $f_u$ are obtained and compared. The frequencies $f_u$ and $f_l$ are then varied, in unison, i.e. while maintaining their fixed frequency separation, until the responses of the ring at the frequencies $f_u$ and $f_l$ are equal. The line center of the resonance $f_N$ is defined as that frequency at which the response of the ring at the frequencies $f_u$ and $f_l$ is equal, according to the relation $f_N = (\nu_l + \nu_u)/2 + f_c$, where $f_c$ is the optical-frequency of the laser light, and $\nu_l$ and $\nu_u$ are RF frequencies such that $f_l = f_c + \nu_l$ and $f_u = f_c + \nu_u$.

Figure 5:
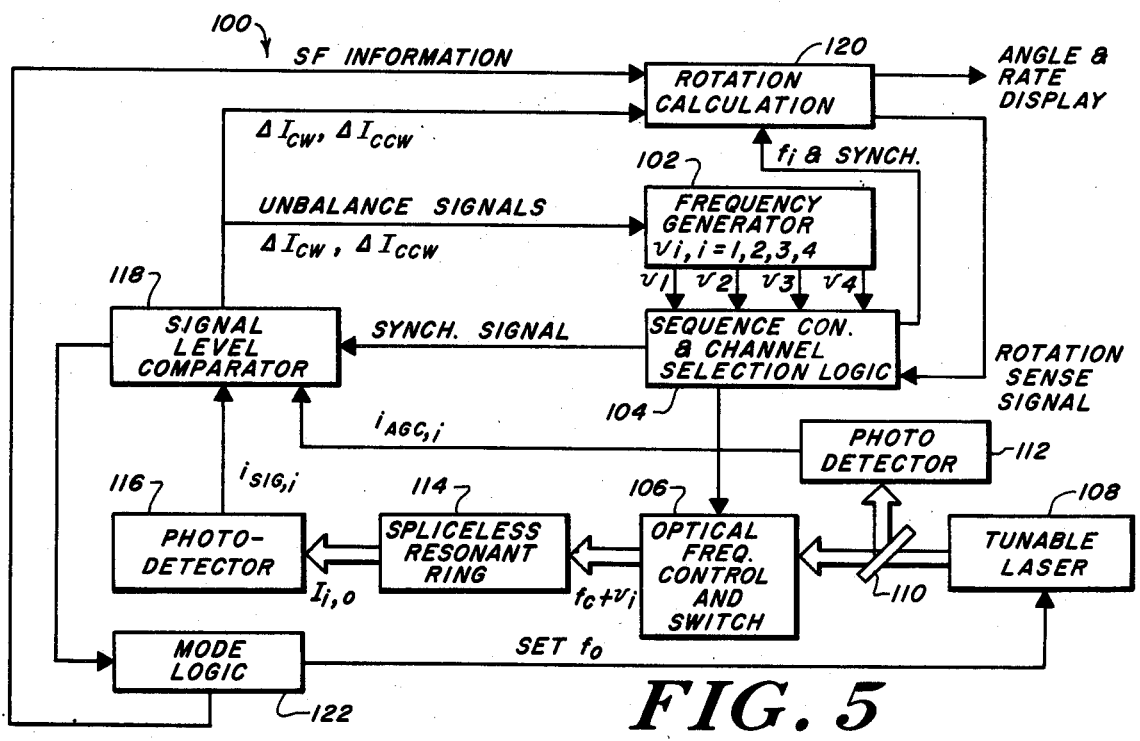
FIG. 5 shows a block diagram of the signal processor of the spliceless optical-fiber resonant-ring gyroscopic system of the present invention.

Referring now to FIG. 5, generally shown at 100 is a block diagram of the signal processor of the spliceless optical-fiber resonant-ring gyroscopic system of the present invention operative to determine the line center of the ring resonance in accordance with the description in connection with FIG. 4, above. A frequency generator 102 of known design is operative to sequentially produce a first RF-frequency $\nu_1$, a second RF-frequency $\nu_2$, a third RF-frequency $\nu_3$, and a fourth RF frequency $\nu_4$. Frequencies $\nu_1$ and $\nu_2$ are separated by a constant frequency difference which is selected to be approximately equal to the linewidth $\Gamma$ for the $N^{th}$ resonant mode of the spliceless optical-fiber resonant-ring of the present invention, resonance, and frequencies $\nu_3$ and $\nu_4$ are also separated by the same constant frequency difference.

A sequence control and channel selection circuit 104 of known design is operative in response to the frequencies $\nu_i$, where i=1, 2, 3, or 4, to control the potential applied to the electrodes of the crossbar switch 70 (FIG. 3) so that the spliceless optical-fiber ring is excited to produce a resonance in the clockwise direction in a time slot that corresponds to the production of the frequency pair $\nu_1$, $\nu_2$, and so that the spliceless optical-fiber ring is excited to produce a resonance in a counterclockwise direction during the time slot that corresponds to the production of the frequency pair $\nu_3$, $\nu_4$.

The frequencies $\nu_i$, for i=1, 2, 3, 4, are sequentially applied to the optical-frequency shifting device 106. The device 106 adds the RF frequencies to the optical-frequency of the laser light by means of the electrodes 80 of the device 68 (FIG. 3). The RF signals are added to the optical-frequency produced by a tunable narrow-band laser light source 108 having frequency $f_c$, in the frequency controller 68 (FIG. 3) to respectively provide upper and lower frequencies, $f_l = f_c + \nu_l$ and $f_u = f_c + \nu_u$, for the clockwise and the counterclockwise resonances which straddle the line center $f_N$ of the resonance and which correspond to the frequencies $f_u$ and $f_l$ discussed above in connection with FIG. 4.

A portion, for example five percent, of the optical signal produced by the tunable laser 108 is directed by beam splitter 110 onto a photodetector 112 operative to provide a signal designated $i_{AGC,i}$, and the remaining portion, for example 95%, of the light produced by the tunable laser 108 is fed to the optical-frequency shifting device 106. The output signal of the optical-frequency shifting device, designated $f_c + \nu_i$, is coupled into a spliceless optical-fiber resonant-ring 114. The output of the spliceless optical-fiber resonant-ring 114 designated $I_{i,o}$, is directed to a photodetector 116. The photodetector 116 is operative in response thereto to provide a signal designated $i_{SIG,i}$ representative of the intensity of the light at the directional-coupler output port for the combined input frequency $f_c + \nu_i$.

A comparator 118 is responsive to the signal representative of the output of the spliceless optical-fiber resonant-ring and to the signal representative of the intensity of the input light to provide, for each frequency pair $\nu_1$, $\nu_2$ and $\nu_3$, $\nu_4$, signals designated $\Delta I_{cw}$, $\Delta I_{ccw}$ respectively representative of the unbalance of the intensity of the spectral response of the spliceless optical-fiber resonant-ring at the corresponding upper and lower frequencies of each of the frequency pairs in corresponding clockwise and counterclockwise resonant modes. Preferably, the signal level comparator 118 is operative to compare the ring intensity at the first frequency of a frequency pair with the intensity at the second frequency of a frequency pair to produce unbalance signals $\Delta I_{cw} = I_2' - I_1'$, $\Delta I_{ccw} = I_4' - I_3'$, where the prime symbols designate the following normalization and averaging:

$$I_i = \frac{1}{\Delta t_i} \int_{t_{i-1}}^{t_{i-1} + \Delta t_i} I_i^{(1)} dt \quad (1)$$

$$I_i^{(1)} = I_i \frac{i_{AGC,NOM}}{i_{AGC,i}} \quad (2)$$

where i=1, 2, 3, 4; $i_{AGC,NOM}$ is a nominal level assigned to $i_{AGC,i}$ for reference purposes; and $\Delta t_i$ is the time interval during which $I_i$ is available from the photodetector.

The unbalance signals are fed back in appropriate time intervals under control of a synchronization signal provided by the control and selection logic 104 to the frequency generator 102 which changes internal frequency multipliers to adapt the frequencies $\nu_i$ until the unbalance signals for the clockwise and the counterclockwise resonances are zero. The condition of zero unbalance signals, $\Delta I_{cw} = \Delta I_{ccw} = 0$ is established quickly and maintained very closely despite changes of rotation rate that shift the line-center resonance frequencies $f_{N,cw}$ and $f_{N,ccw}$. Under this condition the line centers can be determined from $f_{N,cw} = (\nu_1 + \nu_2)/2 + f_c$ and $f_{N,ccw} = (\nu_3 + \nu_4)/2 + f_c$. The difference of these frequencies $\Delta f = f_{N,cw} - f_{N,ccw}$ can be computed from $\nu_i$, i.e., $\Delta f = (\nu_1 + \nu_2)/2 - (\nu_3 + \nu_4)/2$, and used as described above to determine the angular rotation rate $\omega$ from the equation $\Delta f = 4A\omega/n\lambda_0 l$. This calculation is carried out in the rotation calculation block 120. The sign of $\Delta f$ calculated from $\nu_i$ determines the sense of rotation. In a case where such factors as thermal aging cause the laser to drift in frequency beyond the capability of the PZT element 22 (FIG. 1) to correct, the laser can be tuned to operate in another more suitable resonant mode as shown by a block 122. The scale factor information designated SF is applied to the rotation calculation block 120 to adapt it to the particular resonant mode of the ring.

It will be appreciated that many modifications of the presently disclosed invention will become apparent to those skilled in the art without departing from the scope of the appended claims.

What is claimed is:

1. A spliceless optical-fiber resonant-ring laser gyroscopic system, comprising:

a housing having an ultra-low coefficient of thermal expansion;

a selected length of optical-fiber mounted by coiling to said housing to provide an optical-fiber ring having at least one turn, the axis of the ring defining a rotation sensing direction;

an evanescent-wave directional coupler provided along a localized common contiguous region proximate the ends of said optical-fiber to provide a spliceless optical-fiber ring;

first means connected to said housing aand coupled to the ends of the optical-fiber for selectively exciting the spliceless optical-fiber ring alternately in a clockwise and in a counterclockwise resonant mode; and second means coupled to said spliceless optical-fiber resonant-ring and operative in response to said clockwise and counterclockwise resonant modes for providing a signal indication of the rate of angular rotation of said housing about the sensing direction.

2. The spliceless optical-fiber resonant-ring laser gyroscopic system of claim 1, wherein said first means includes a tunable laser for providing narrow-band coherent light and an integrated-optics chip; said integrated-optics chip having a frequency controller responsive to said coherent light and operative to sequentially provide a first frequency $f_1$ and a second frequency $f_2$ during a time slot that corresponds to the excitation of the ring in the clockwise resonant mode where, the absolute magnitude of the difference in frequency between the frequencies $f_1$ and $f_2$ is held at a precisely constant value that is close to the linewidth of the clockwise ring resonance of the spliceless optical-fiber resonant-ring, and to sequentially provide a third frequency $f_3$ and a fourth frequency $f_4$ during a time slot that corresponds to the excitation of the ring in the counterclockwise resonant mode, where the absolute magnitude of the difference in frequency between the frequency $f_3$ and the frequency $f_4$ is held to the same precise value as the difference between $f_1$ and $f_2$.

3. The spliceless optical-fiber resonant-ring laser gyroscopic system of claim 2, wherein said second means is responsive to the difference in the signal representative of the output from the ring at the frequencies $f_1$ and $f_2$ during the clockwise excitation of the ring and to the difference in the signal representative of the output from the ring at the frequencies $f_3$ and $f_4$ during the counterclockwise excitation of the ring and operative to controllably vary the frequencies $f_1$ and $f_2$ in unison and to controllably vary the frequencies $f_3$ and $f_4$ in unison until the signals representative of the response of the ring at the frequencies $f_1$ and $f_2$ and the frequencies $f_3$ and $f_4$ meet a predetermined criteria.

4. The spliceless optical-fiber resonant-ring laser gyroscopic system of claim 3, wherein said criteria is selected such that the response of the ring at the frequency $f_1$ is equal to the response of the ring at the frequency $f_2$, and the response of the ring at the frequency $f_3$ is equal to the response of the ring at the frequency $f_4$.

5. The spliceless optical-fiber resonant-ring laser gyroscopic system of claim 2, wherein said housing is cylindrically shaped, and wherein said tunable source of narrow-band coherent light is a gas-discharge laser integrally formed within the monolithic housing.

6. The spliceless optical-fiber resonant-ring laser gyroscopic system of claim 5, wherein said integrated-optics chip is fixably mounted to an extremely flat and polished surface provided therefor on said monolithic cylindrically shaped housing.

7. The spliceless optical-fiber resonant-ring laser gyroscopic system of claim 1, wherein said evanescent-field directional coupler provided along a localized common region proximate the ends of the optical-fiber includes a jacket surrounding said localized common region proximate the ends of said optical-fiber, and further includes means provided within said jacket for maintaining the region of the optical-fiber between the ends thereof a preselected distance apart.

8. The spliceless optical-fiber resonant-ring laser gyroscopic system of claim 7, wherein said preselected distance is selected to achieve a desired coefficient of coupling between the region the optical-fibers in said jacket, the coefficient of coupling being selected so that its difference from unity is equal to the total fractional power loss experienced by light when circulating in the ring.

* * * * *

UNITED STATES PATENT AND TRADEMARK OFFICE
CERTIFICATE OF CORRECTION

PATENT NO. : 4,678,334　　　　　　　　　Sheet 1 of 2
DATED　　　 : July 7, 1987
INVENTOR(S) : Godfrey T. Coate; Joseph D. Coccoli It is certified that error appears in the above-identified patent and that said Letters Patent is hereby corrected as shown below:

Title page:

In the Abstract:
    10th line　"evanescant-wave" should read --evanescent-wave--

Column 2, line 34,　"with the" should read --within the--

Column 4, line 18,　"cores 52" should read --cores 53--
　　　　　　line 37,　"diagrametic" should read --diagrammatic--

Column 5, line 1,　"occassioned" should read --occasioned--

Column 6, line 33,　"$\Delta f = 4A\, \omega/n\lambda_o 1,$" should read --$\Delta f = 4A\, \omega/n\lambda_o \ell,$-- line 34,　"and 1 is" should read --and $\ell$ is--

Column 8, line 7,　"$I_i = \frac{1}{\Delta t_i}$" should read --$I'_i = \frac{1}{\Delta t_i}$--

Column 8, line 32,　"$\Delta f = 4A\, \omega/n\lambda_c 1.$" should read --$\Delta f = 4A\, \omega/n\lambda_o \ell.$--

UNITED STATES PATENT AND TRADEMARK OFFICE
CERTIFICATE OF CORRECTION

PATENT NO. : 4,678,334

DATED : July 7, 1987

INVENTOR(S) : Godfrey T. Coate; Joseph D. Coccoli

It is certified that error appears in the above-identified patent and that said Letters Patent is hereby corrected as shown below:

Column 8, line 60, "aand" should read --and--

Column 10, line 30, "between the region the opical-fibers" should read --between the region of the optical fibers--

Signed and Sealed this

Fourth Day of October, 1988

Attest:

DONALD J. QUIGG

*Attesting Officer*  *Commissioner of Patents and Trademarks*